United States Patent
Kim et al.

(10) Patent No.: US 11,003,985 B2
(45) Date of Patent: May 11, 2021

(54) CONVOLUTIONAL NEURAL NETWORK SYSTEM AND OPERATION METHOD THEREOF

(71) Applicant: ELECTRONICS AND TELECOMMUNICATIONS RESEARCH INSTITUTE, Daejeon (KR)

(72) Inventors: Jin Kyu Kim, Sejong (KR); Byung Jo Kim, Sejong (KR); Seong Min Kim, Sejong (KR); Ju-Yeob Kim, Daejeon (KR); Mi Young Lee, Daejeon (KR); Joo Hyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 712 days.

(21) Appl. No.: 15/806,111

(22) Filed: Nov. 7, 2017

(65) Prior Publication Data

US 2018/0129935 A1   May 10, 2018

(30) Foreign Application Priority Data

Nov. 7, 2016   (KR) .................. 10-2016-0147744
Mar. 6, 2017   (KR) .................. 10-2017-0028471

(51) Int. Cl.
*G06N 3/063*   (2006.01)
*G06F 7/544*   (2006.01)
(Continued)

(52) U.S. Cl.
CPC .......... *G06N 3/063* (2013.01); *G06F 7/5443* (2013.01); *G06F 17/15* (2013.01); *G06F 17/153* (2013.01);
(Continued)

(58) Field of Classification Search
CPC ........ G06F 17/15; G06F 17/153; G06F 17/16; G06F 7/5443; G06N 3/04; G06N 3/0454; G06N 3/063; G06N 3/082
See application file for complete search history.

(56) References Cited

U.S. PATENT DOCUMENTS

| 2016/0078863 A1 | 3/2016 | Chung et al. |
| 2016/0162782 A1 | 6/2016 | Park |

(Continued)

FOREIGN PATENT DOCUMENTS

| KR | 10-2016-0032536 A | 3/2016 |
| KR | 10-2016-0069834 A | 6/2016 |

(Continued)

OTHER PUBLICATIONS

Chen Zhang et al., "Optimizing FPGA-based Accelerator Design for Deep Convolutional Neural Networks", Proceeding of the 2015 ACM/SIGDA International Symposium on FPGA, 2015, pp. 161-170, ACM.

*Primary Examiner* — Andrew Caldwell
*Assistant Examiner* — Emily E Larocque

(57) ABSTRACT

Provided is a convolutional neural network system including a data selector configured to output an input value corresponding to a position of a sparse weight from among input values of input data on a basis of a sparse index indicating the position of a nonzero value in a sparse weight kernel, and a multiply-accumulate (MAC) computator configured to perform a convolution computation on the input value output from the data selector by using the sparse weight kernel.

13 Claims, 10 Drawing Sheets

(51) Int. Cl.
*G06N 3/04* (2006.01)
*G06F 17/15* (2006.01)
*G06N 3/08* (2006.01)

(52) U.S. Cl.
CPC ............ *G06N 3/04* (2013.01); *G06N 3/0454* (2013.01); *G06N 3/082* (2013.01)

(56) References Cited

U.S. PATENT DOCUMENTS

| | | |
|---|---|---|
| 2016/0239706 A1 | 8/2016 | Dijkman et al. |
| 2016/0240190 A1 | 8/2016 | Lee et al. |
| 2016/0260426 A1 | 9/2016 | Kim et al. |
| 2016/0322042 A1 | 11/2016 | Vlietinck et al. |
| 2016/0358069 A1 | 12/2016 | Brothers et al. |
| 2017/0132496 A1* | 5/2017 | Shoaib ................. G06K 9/66 |
| 2017/0323197 A1* | 11/2017 | Gibson ................. G06N 3/08 |
| 2017/0344876 A1* | 11/2017 | Brothers .............. G06N 3/0454 |
| 2018/0046894 A1* | 2/2018 | Yao ..................... G06F 7/483 |
| 2018/0046898 A1* | 2/2018 | Lo ...................... G06F 17/16 |

FOREIGN PATENT DOCUMENTS

| | | |
|---|---|---|
| KR | 10-2016-0099212 A | 8/2016 |
| KR | 10-2016-0106270 A | 9/2016 |

\* cited by examiner

CONVOLUTIONAL NEURAL NETWORK SYSTEM AND OPERATION METHOD THEREOF

CROSS-REFERENCE TO RELATED APPLICATIONS

This U.S. non-provisional patent application claims priority under 35 U.S.C. § 119 of Korean Patent Application Nos. 10-2016-0147744, filed on Nov. 7, 2016, and 10-2017-0028471, filed on Mar. 6, 2017, the entire contents of which are hereby incorporated by reference.

BACKGROUND

The present disclosure herein relates to a deep neural network, and more particularly to a convolutional neural network system and an operation method thereof.

As a technology for image recognition, a convolutional neural network (CNN) is being actively researched which is one of deep neural network schemes. A neural network structure shows an eminent performance in various object cognition fields such as object recognition or handwriting recognition. In particular, the CNN provides very effective performance to the object recognition.

Recently, as an efficient CNN structure is suggested, a recognition ratio using a neural network reaches that of a human. However, the CNN has a very complex structure and requires a large amount of computations. Therefore a hardware acceleration scheme using a high performance server or a GPU is adopted. In the CNN structure, most computations generated in the inner side are performed using a multiply-accumulate (MAC) computator. However, since the number of connections between nodes in the CNN is very large and the number of parameters requiring multiplications is also large, a large amount of computations is required in a learning process or a recognition process and thus large hardware resources are required.

SUMMARY

The present disclosure provides a convolutional neural network system and an operation method thereof capable of reducing convolution computations on the basis of sparse weights generated according to neural network compression in the convolutional neural network.

The present disclosure also provides an effective computation method and device for a convolutional neural network system using sparse weights and thus improves an overall performance by reducing a computation performance time according thereto.

An embodiment of the inventive concept provides convolutional neural network system including: a data selector configured to output an input value corresponding to a position of a sparse weight from among input values of input data on a basis of a sparse index indicating the position of a nonzero value in a sparse weight kernel; and a multiply-accumulate (MAC) computator configured to perform a convolution computation on the input value output from the data selector by using the sparse weight kernel, wherein the sparse weight kernel includes at least one weight value of '0'.

In an embodiment, the data selector may be configured not to output, from among the input values, an input value corresponding to a position of '0' in the sparse weight kernel.

In an embodiment, the convolutional neural network system may further include: an input buffer device configured to store, from an external memory, an input tile that is a part of the input data; and an output buffer device configured to store a result value of the convolution computation from the MAC computator and to provide the stored result value to the external memory.

In an embodiment, the convolutional neural network system may further include a weight kernel buffer device configured to receive the sparse weight kernel from an external memory, provide the received sparse weight kernel to the MAC computator, and provide the sparse index of the sparse weight kernel to the data selector.

In an embodiment, the data selector may include: a switch circuit; and a plurality of multiplexes (MUXes), wherein the switch circuit is configured to provide the respective input values to the plurality of MUXes on a basis of the sparse weight kernel, and each of the plurality of MUXes is configured to select and output, on a basis of the sparse index, the input value corresponding to the position of the sparse weight from among the input values provided by the switch circuit.

In an embodiment, the MAC computator may include a plurality of MAC cores configured to receive the respective input values output from the plurality of MUXes, and to perform the convolution computation on the received input values on the basis of the sparse weight kernel.

In an embodiment, each of the plurality of MAC cores may include: a multiplier configured to perform a multiplication on the input value and the sparse weight; an adder configured to perform addition on a result of the multiplication and a previous addition result; and a register configured to store a result of the addition.

In an embodiment, the sparse weight kernel may be a weight kernel converted from a full weight kernel through a neural network compression, and the full sparse weight kernel is configured from nonzero weight values.

In an embodiment, the neural network compression may be performed on a basis of at least one of a parameter dropout scheme, a weight sharing scheme, or a parameter quantization scheme for the full weight kernel.

In an embodiment of the inventive concept, a convolutional neural network system includes: an input buffer device configured to receive, from an external memory, an input tile including a plurality of input values, and store the plurality of input values of the received input tile; a data selector configured to output at least one input value from among the plurality of input values from the input buffer device on a basis of a sparse index indicating a position of a sparse weight of nonzero in a sparse weight kernel; a multiply-accumulate (MAC) computator configured to perform a convolution computation on a basis of the sparse weight and the at least one input value from the data selector; and an output buffer device configured to store a result value of the convolution computation from the MAC computator and to provide the stored result value to the external memory as an output tile.

In an embodiment, the data selector may include: a switch circuit; and a plurality of multiplexes (MUXes), wherein the switch circuit is configured to respectively connect the plurality of input values to the plurality of MUXes on a basis of the sparse weight kernel and a size of the input tile, and each of the plurality of MUXes is configured to select and output, on the basis of the sparse index, the at least one input value corresponding to the position of the sparse weight from among the connected input values.

In an embodiment, each of the plurality of MUXes may not output an input value corresponding to a '0' weight in the sparse weight kernel.

In an embodiment, the at least one input value from each of the plurality of MUXes may be an input value corresponding to the position of the sparse weight.

In an embodiment, when the sparse weight kernel has a size of K×K (where K is a natural number), the switch circuit may be configured to connect 2K input values to the plurality of MUXes.

In an embodiment, the MAC computator may include a plurality of MAC cores configured to perform the convolution computations on the basis of the sparse weight kernel and the at least one input value from each of the plurality of MUXes.

In an embodiment of the inventive concept, an operation method of a convolutional neural network system includes: storing an input tile that is a part of input data; respectively connecting input values of the input tile to a plurality of multiplexers (MUXes) on a basis of a sparse weight kernel; selecting at least one of the connected input values on a basis of a sparse index for the sparse weight kernel in each of the plurality of MUXes; performing a convolution computation on the at least one selected input value by using the sparse weight kernel; accumulating a result of the convolution computation; and providing an accumulated result to an external memory as an output tile.

In an embodiment, the selecting may include selecting input values corresponding to positions of nonzero weights in the sparse weight kernel and not selecting input values corresponding to positions of '0' weights in the sparse weight kernel.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, an exemplary embodiment of the present disclosure will be described in detail with reference to the accompanying drawings such that a person skilled in the art may easily carry out the embodiments of the present disclosure.

Typically, a convolution computation indicates a computation for detecting a correlation between two functions. A term of convolutional neural network (hereinafter referred to as CNN) may collectively call a process or system for determining an image pattern or extracting an image feature by repetitively performing a convolution computation between a kernel indicating input data or specific feature and a specific parameter (e.g., a weight, a bias, etc.).

Hereinafter, a value provided to a CNN system for a specific computation operation, or a value generated or output as a result of a specific computation is called as data. The data may indicate an image input to the CNN system, or a specific feature map or specific values generated by a specific layer in the CNN system.

In addition, a filter, a window, a mask or the like used for signal processing (e.g. a convolution computation) for input data is commonly called as a kernel. Furthermore, in a detailed description below, in order to clearly describe embodiments of the inventive concept and avoid ambiguity of the embodiments, functions, configurations, circuits, systems, or operations well known to persons skilled in the art will be omitted.

In addition, functional blocks used in the description or drawings may be realized in software, hardware, or a combination thereof in embodiments of the inventive concept. The software may be a mechanical code, firmware, an embedded code, and application software, and the hardware may be a circuit, a processor, a computer, an integrated circuit, integrated circuit cores, a pressure sensor, an inertial sensor, a microelectromechanical system (MEMS), passive elements, or a combination thereof.

Figure 1:
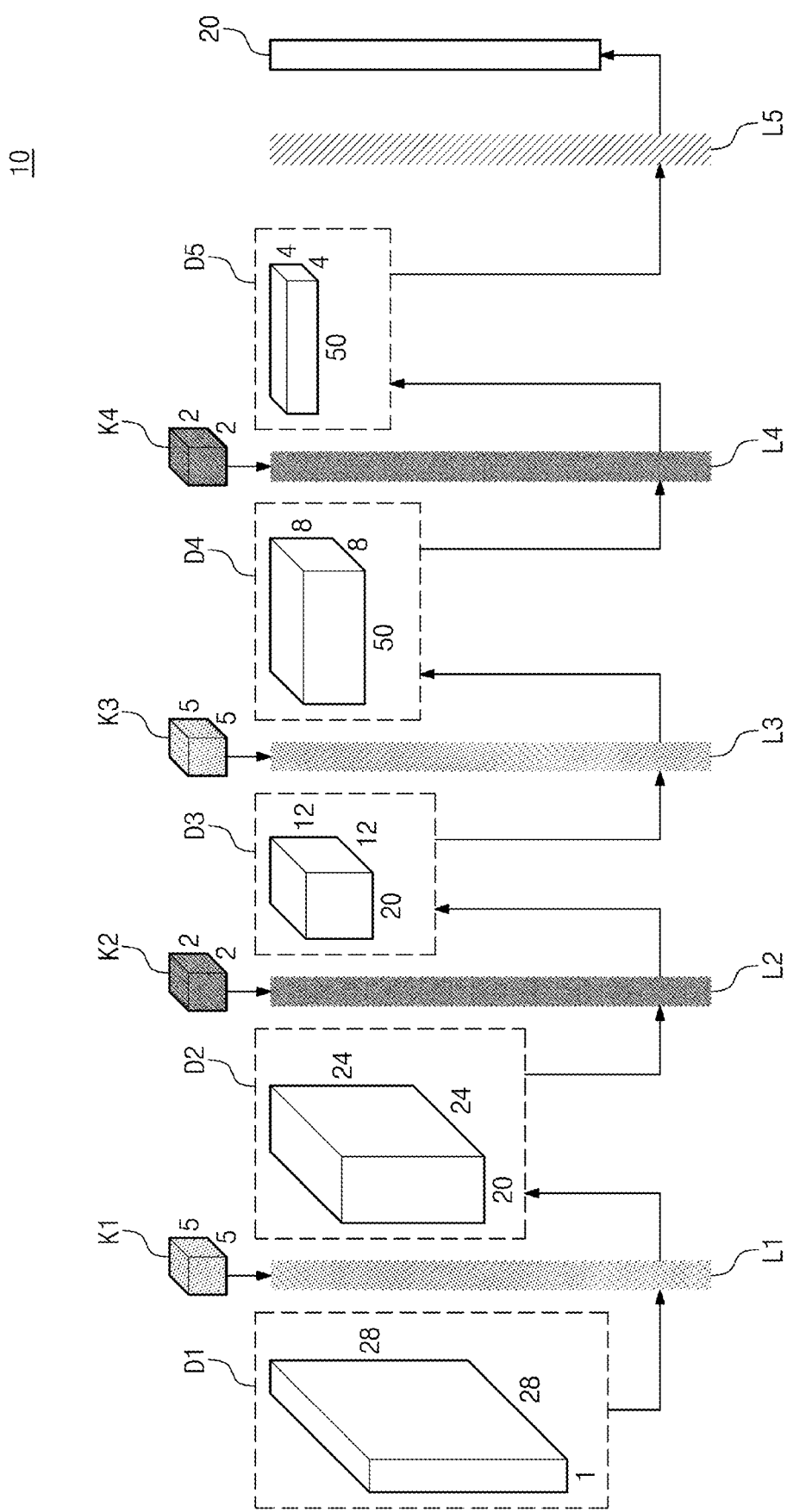
FIG. 1 illustrates exemplary layers implemented in a convolutional neural network (CNN) according to an embodiment of the inventive concept.

FIG. 1 shows exemplary layers realized in a convolutional neural network (CNN) according to an embodiment of the inventive concept. Referring to FIG. 1, the CNN 10 may output input data as a fully connected layer through various computations (e.g. a convolution computation, a sub-sampling, or the like) in various layers, For example, it is assumed that first data D1 is input data to be input to the CNN 10 and is a gray image having a 1×28×28 pixel size. In other words, a channel depth of the first data D may be '1'. When the first data D1 is input to the CNN 10, a first layer L1 may perform a convolution computation for the first data D1 by using a first kernel K1 to output or generate second data D2. For example, the first layer L1 may be a convolutional layer. When the first kernel K1 has a 5×5 size and a convolution computation is performed without data padding in an edge region of the first data D1, the second data D2 may have a 24×24 size and 20 channels. In other words, the second data D2 may be output in a size of 24×24×20 (data width×data height×channel).

Thereafter, a second layer L2 may perform a pooling operation on the second data D2 to output or generate third data D3. For example, the second layer L2 may be a pooling layer. The pooling operation in the second layer L2 indicates an operation for adjusting, for the second data D2, the channel width and height, while maintaining the number of channels in a spatial domain. As a detailed example, when the pooling operation is performed using a second kernel K2 having a 2×2 size, the third data D3 generated in the second layer L2 may have a 12×12 size and 20 channels. In other words, the third data D3 may be output in a size of 20×12×12 (data channel×data width×data height).

Thereafter, the third layer L3 may perform a convolution computation on the third data D3 by using the third kernel K3 to output or generate fourth data D4. Then, a fourth layer L4 may perform a pooling operation on the fourth data D4 by using the fourth kernel K4 to output or generate fifth data D5. At this point, the fourth data D4 may be output in a size of 50×8×8 (channel×data width×data height), and the fifth data D5 may be output in a size of 50×4×4 (channel×data width×data height). In example embodiment, the third and fourth layers L3 and L4 may be respectively a convolutional layer and a pooling layer, and may perform similar operations to those of the first and second layers L1 and L2. In an example embodiment, operations for the first to fourth layers L1 to L4 may be repetitively performed until a specific condition is satisfied.

A fifth layer L5 may perform a fully-connected network operation on the fifth data D5 to output fully-connected data 20. In an example embodiment, unlike the convolutional layer of the first layer L1 or the third layer L3, the fifth layer L5, which is a fully-connected layer, does not use a kernel and the entire nodes of the input data may maintain the entire connection relationship with the entire nodes of output data.

In example embodiment, each of the layers L1 to L5 of the CNN 10 illustrated in FIG. 1 is simply represented, and the real CNN 10 may include more layers.

In an example embodiment, the numbers of parameters and connections in each of the layers L1 to L5 of FIG. 1 may be the same as shown in Table 1. In an example embodiment, exemplary numbers written in Table 1 are based on the size of each piece of data shown in FIG. 1.

TABLE 1

| Layer | First layer L1 Convolutional layer | Third layer L3 Convolutional layer | Fifth layer L5 Fully-connected layer |
|---|---|---|---|
| Number of weights | 500 | 25,000 | 400,000 |
| Number of biases | 20 | 50 | 500 |
| Number of connections | 299,520 | 1,603,200 | 400,500 |

Referring to Table 1, the number of weights of each layer is {number of output channels*number of input channels*kernel height*kernel width}. In other words, for the first layer L1, since the number of output channels is 20, the number of input channels is 1, the height of the kernel is 5, and the width of the kernel is 5, the number of weights used in the first layer L1 is 20*1*5*5=500. Similarly, the number of weights used in the third layer L3 is 25,000, and the number of weights used in the fifth layer L5 is 400,000.

The number of biases of each layer is {the number of output channels}. In other words, for the first layer L1, since the number of output channels is 20, the number of biases used in the first layer L1 is 20. Similarly, the number of biases used in the third layer L3 is 50, and the number of biases used in the fifth layer L5 is 500.

The number of connections of each layer is the same as {the number of parameters*the height of output data*the width of output data}. The number of parameters indicates a sum of the number of weights and the number of biases. In other words, for the first layer L1, since the number of parameters is 520, the height of the output data is 24, and the width of the output data is 24, the number of connections of the first layer L1 is 520*24*24=299,520. Similarly, the number of connections of the third layer L3 is 1,603,200, and the number of connections of the fifth layer L5 is 400,500.

As shown in Table 1, the convolutional layer (e.g. L1 and L3) has fewer parameters than the fully-connected layer (e.g. L5). However, since some convolutional layers (e.g. L3) have more connections than the fully-connected layer (e.g. L5), the some convolutional layers require more computation amounts. Various methods are being developed for reducing the computation amount of such a convolutional layer.

In an example embodiment, similarly to the above-described, a neural network may include an input layer, a hidden layer, and an output layer. The input layer is configured to receive and deliver input data for performing learning, and the output layer is configured to generate an output of the neural network on the basis of data from the hidden layer. The hidden layer may change the input data delivered through the input layer to values to be simply predicted. Nodes included in the input layer and the hidden layer may be connected to each other through weights, and nodes included in the hidden layer and the output layer may be connected to each other through weights.

In the neural network, a computation throughput between the input layer and the hidden layer may be determined according to the numbers or sizes of input and output data. In addition, as the depth of each layer is deepened, the weight size and the computation throughput according to the input and output layers may rapidly increase. Accordingly, in order to realize the neural network with hardware, a method or a device may be required for reducing the size of such a parameter.

For example, as a method for reducing the parameter size, a neural network compression scheme may be used. The neural network compression scheme may include a parameter dropout scheme, a weight sharing scheme, a quantization scheme, or the like. The parameter dropout scheme is a scheme for dropping out a parameter of which weight is the smallest from among parameters inside the neural network. The weigh sharing scheme is a scheme for reducing the number of parameters to be processed by sharing parameters of which weights are similar. In addition, the quantization scheme is used to quantize bit sizes of the weights, input and output layers, and hidden layer, and to reduce the number of parameters. Hereinbefore, the descriptions have been briefly provided about data and kernels for each layer and connection parameters of the CNN 10.

Figure 2:
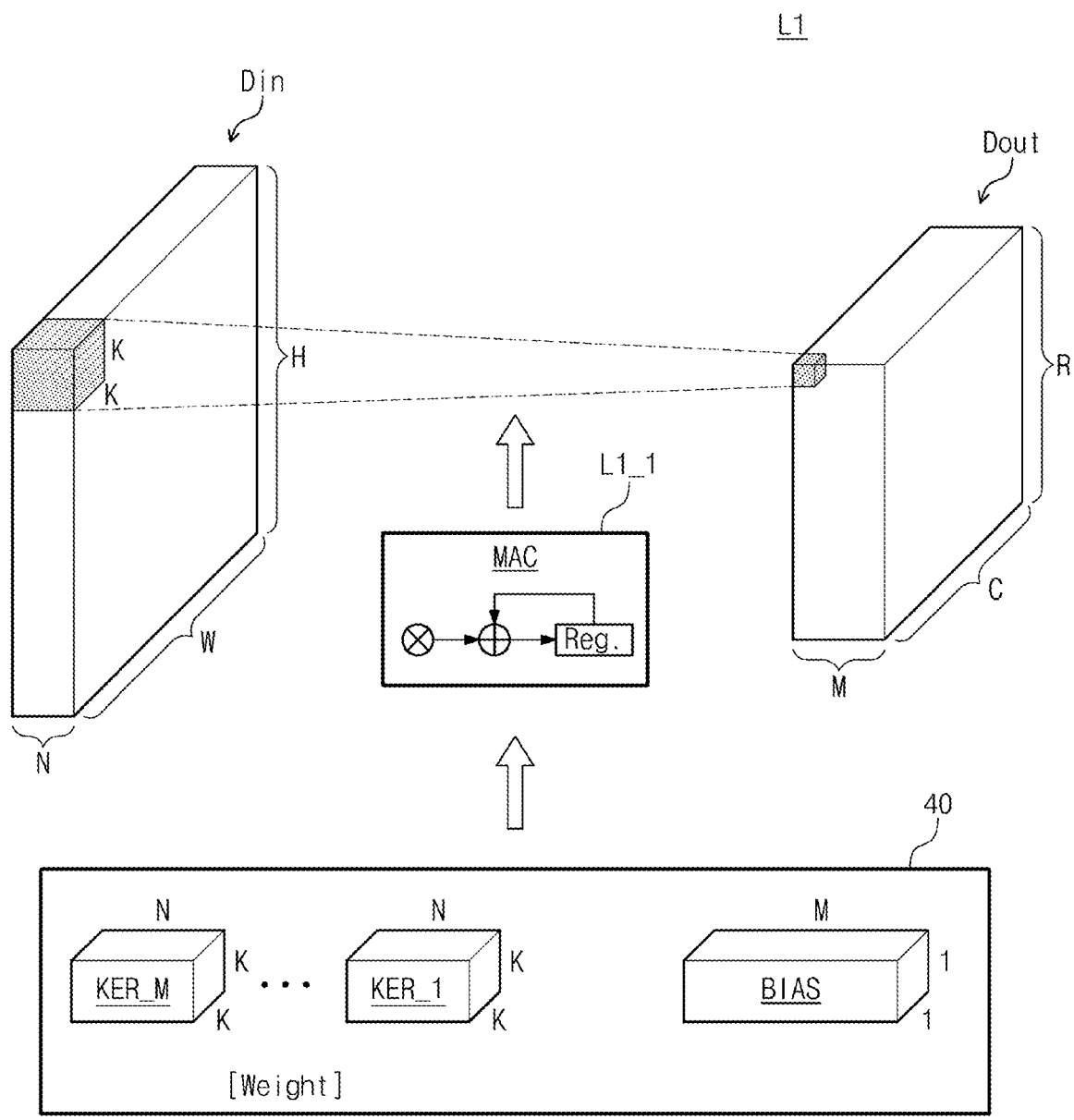
FIG. 2 is a drawing for explaining an operation of a convolutional layer of the CNN in FIG. 1.

FIG. 2 is a drawing for explaining an operation of convolutional layer of the CNN in FIG. 1. For brief explanation, unnecessary elements in explaining the convolutional layer of the CNN 10 will be omitted. In addition, it is assumed that the convolutional layer is the first layer L1 of FIG. 1.

Referring to FIGS. 1 and 2, the input data Din has the size of N×W×H and for the input data Din, the output data Dout on which a convolution computation has been performed has the size of M×C×R. At this point, N denotes the number of channels of the input data Din, W denotes the width of the input data Din, and H denotes the height of the input data Din. M denotes the number of channels of the output data Dout, C denotes the width of the output data Dout, and R denotes the height of the output data Dout.

A multiply-accumulate (MAC) core L1_1 of the first layer L1 may generate the output data Dout by performing a convolution computation on the input data Din on the basis of a plurality of kernels KER_1 to KER_M. For example, each of the plurality of kernels KER_1 to KER_M may have the size of N×K×K. The MAC core L1_1 may multiply a kernel of a K×K size by each piece of overlapping data of the input data Din. The MAC core L1_1 may accumulate data values multiplied for each channel of the input data Din to generate one output data value (i.e. a data value of 1×1×1). The MAC core L1_1 may recursively perform such a computation operation to generate the output data Dout for each of the plurality of kernels KER_1 to KER_M. At this point, the number of channels of the output data Dout may be the same as the number (i.e. M) of the plurality of kernels KER_1 to KER_M.

In example embodiment, the MAC core L1_1 may use an adder, a multiplier, a register or the like to perform the above-described convolution computation. For example, the multiplier of the MAC core L1_1 may perform a multiplication on input values of the input data and corresponding weight values. The adder may perform an addition on the result of the multiplication and previous computation results stored in the register. The register may store results of the addition. Thereafter, other input values may be input to the MAC core L1_1 and recursively perform the above-described computation to perform a convolution computation.

However, the scope of the inventive concept is not limited thereto, and the convolution computation may be realized through a simple adder, the multiplier, a separate storage circuit and the like, instead of the MAC core L1_1. A bias may be added to the output data Dout with a size of the number M of the channels.

In example embodiment, a flow of the above-described convolution computation may be expressed as Table 2. An algorithm configuration or program code shown in Table 2 is for exemplarily showing the flow of the convolution computation, but the scope of the inventive concept is not limited thereto.

TABLE 2

```
// Basic convolution computation
for ( row=0 ; row<R ; row++) {
  for ( col=0 ; col<C ; col++) {
    for ( to=0 ; to<M ; to++) {
      for ( ti=0 ; ti<N ; ti++) {
        for ( i=0; i<K ; i++) {
          for ( j=0 ; j<K ; j++) {
            output [to] [row] [col] +=
              weights [to] [ti] [i] [j] *
              input [ti] [ S*row+i] [ S*col+j] ;
}}}}}}
```

Referring to Table 2, 'input' is the input data Din, and 'output' is the output data Dout. R, C, M, N and K are variables denoting the sizes of the input data Din and the output data Dout. Correlation between H, W and R, C may be expressed as H=R+K−1 and W=C+K−1.

According to the flow of the above-described convolution computation, when the size of the input/output data is very large, it may be difficult to perform a normal computation operation due to a limitation of a bandwidth of a memory for computation.

Various conditions should be considered to effectively realize the above-described CNN 10 with hardware. For example, in order to realize the CNN 10 with hardware, it is required to minimize a memory bandwidth required to transmit data and parameters. For recognition of an object, a real-time image data input from a camera or image data stored in an external memory is input to a hardware circuit configuring the CNN 10. As a detailed example, a very large memory bandwidth is required to support about 30 frames per second in a real-time image. In order to support pixel data having the size of 640×480 in each of three channels (red, green, and blue), data is required to be continuously input at 28 Mbytes per second. In addition, separately from the input data, parameter data used in various computations such as a convolution computation is required to be input to the hardware circuit. As an example, AlexNet requires about 61,000,000 parameters every time a single image is recognized. When it is assumed that a bit width of each parameter is 16 bits, parameters of 128 Mbyte size are required. Furthermore, since a hardware circuit has an internal structure for simultaneously computing data and parameters, the circuit is required to frequently exchange output data and parameters with an external memory.

In addition, it is required to enhance a computation performance by effectively realizing a convolution computator included in the hardware circuit for realizing the CNN 10. Typically, a convolution computation is performed using processing elements arranged in an array structure. In such an array-structured computator, it is important to control a parameter configured from a weight and a bias, and buffering of input/output data. In addition, in order to enhance a throughput processed for a unit time, buffering of the parameters is important which are input to a convolver computator of an array structure.

Considering the above conditions, computation hardware for processing a large computation amount may be efficiently designed by properly dividing the input data, the output data, or the parameters. For example, the CNN 10 may uniformly divide the input data, and read and process the input data in a divided data unit. Then, the MAC core L1_1 may recursively process computations as many as the number of divided pieces of data and store the computation results in an external memory. In other words, hardware resources of the CNN 10 is limited and the limitation of the hardware resources may be overcome by recursively using a partial convolution computation for dividing and computing the input data.

Figure 3:
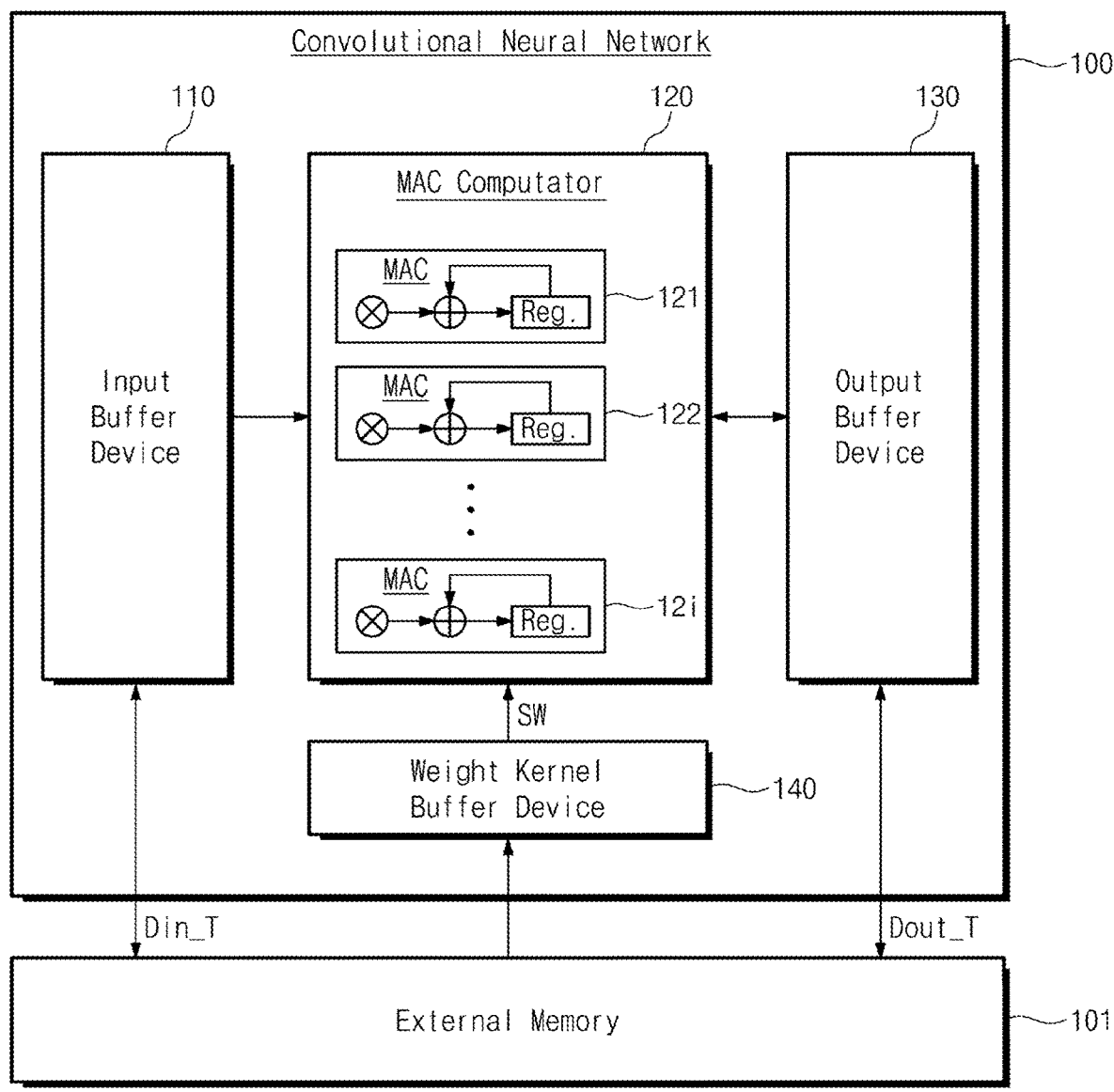
FIG. 3 is a block diagram exemplarily showing a hardware configuration for implementing a CNN system for performing a partial convolution computation.

FIG. 3 is a block diagram exemplarily showing a hardware configuration for realizing a CNN system for performing a partial convolution computation. FIG. 3 illustrates indispensable components for realizing a neural network system according to an embodiment of the inventive concept with hardware such as a field programmable gate array (FPGA) or a graphics processing unit (GPU). Functional blocks to be illustrated and described may be realized with a hardware configuration, a software configuration, or a combination thereof.

Referring to FIG. 3, the CNN system 100 may include an input buffer device 110, a MAC computator 120, an output buffer device 130, and a weight kernel buffer device 140. The CNN system 100 may be connected to an external memory 101 and configured to exchange a part Din_T of input data, a weight kernel, and a part Dout_T of output data.

For example, the input buffer device 110 may load the part Din_T of the input data from the external memory 101. For example, in order to perform a partial computation as described above, the input data may be uniformly divided. The input buffer device 110 may load the part Din_T of the divided input data from the external memory 101. For brief explanation, the part Din_T of the input data loaded to the input buffer device 110 is called as an input tile.

In example embodiment, the size of the input buffer device 110 may vary according to the size of the kernel for convolution computation. For example, when a kernel size is K×K, the input data having a sufficient size is required to be loaded to the input buffer device 110 for a sequential convolution computation with the kernel by the MAC computator 120. In other words, the size of the input buffer device 110 or the size of the input tile Din_T may be determined on the basis of the kernel size.

The MAC computator 120 may perform a convolution computation using the input buffer device 110, the weight kernel buffer device 140, and the output buffer device 140. For example, the MAC computator 120 may include a plurality of MAC cores 121 to 12i. As described in relation to FIG. 2, each of the plurality of MAC cores 121 to 12i may use a plurality of kernels to perform convolution computations on the input tile Din_T. At this point, the convolution computations may be processed in parallel. The number of the plurality of MAC cores 121 to 12i may be determined according to the kernel size or the size of the input tile Din_T. For example, each of the plurality of MAC cores 121 to 12i may perform a similar operation to or has a similar structure to the MAC core L1_1 described in relation to FIG. 2.

The output buffer device 130 may load the part Dout_T of the output data of the convolution computation or pooling operation executed by the MAC computator 120. The part Dout_T of the output data, which is loaded to the output buffer device 130, may be updated according to an execution result of each convolution computation loop by the plurality of kernels. Alternatively, the part Dout_T of the output data, which is loaded to the output buffer device 130, may be provided to the external memory 101, and a part Dout_T of the plurality of pieces of output data may be combined to configure the output data Dout. Hereinafter, for brief explanation, the part Dout_T of the output data loaded to the output buffer device 130 is called as an output tile.

The weight kernel buffer device 140 may load, from the external memory 101, parameters necessary for convolution computation, bias addition, activation ReLU, pooling, or the like performed by the MAC computator 120, and may provide the loaded parameters to the MAC computator 120. In addition, the parameters learnt in a learning stage may be stored in the weight kernel buffer device 140. The learnt parameters stored in the weight kernel buffer device 140 may be provided to the external memory 101 and updated.

Figure 4:
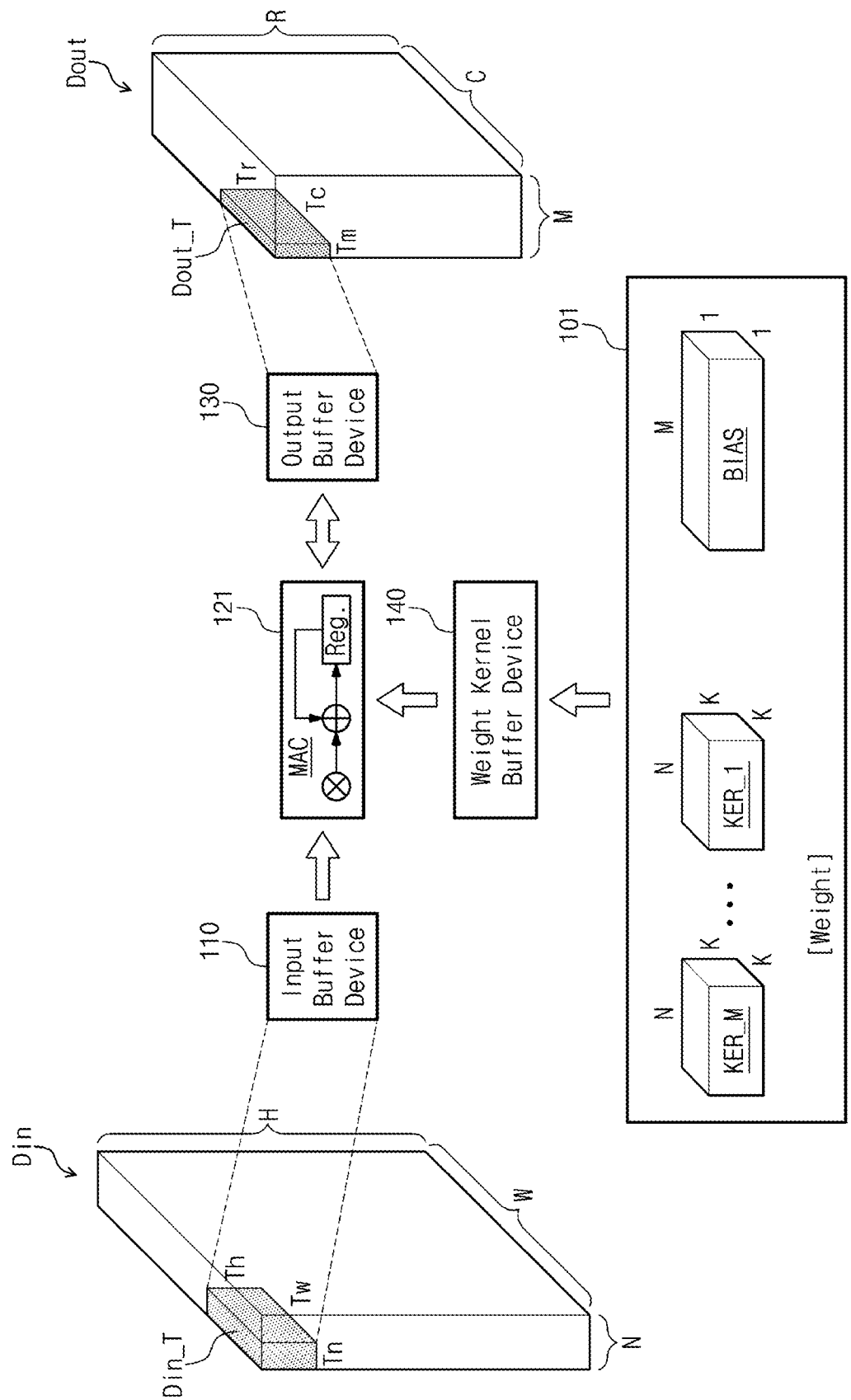
FIG. 4 is a drawing for explaining a convolution computation the CNN system in FIG. 3.

FIG. 4 is a drawing for explaining the convolution computation the CNN system in FIG. 3. For brief explanation, a configuration in which one MAC core 121 performs a convolution computation is illustrated in FIG. 4, and unnecessary elements in explaining the convolution computation of the CNN system 100 will be omitted.

Referring to FIGS. 3 and 4, the input buffer device 110 may load an input tile Din_T that is a part of input data Din. At this point, the input tile Din_T may have a size of Tn×Tw×Th. Tn denotes the number of channels of the input tile Din_T, Tw denotes a width of the input tile Din-T, and Th denotes a height of the input tile Din_T. Tn, Tw, and Th may be determined according to the computation capability of the MAC computator 120, the size of the input buffer device 110, the kernel size, or the number of kernels.

The MAC core 121 may use a plurality of kernels KER_1 to KER_M from the weight kernel buffer device 140 to perform convolution computations on the input tile Din_T loaded to the input buffer device 110. In an example embodiment, the MAC core 121 may perform a convolution computation as described in relation to FIG. 2. The MAC core 121 may perform the convolution computation to generate the output tile Dout_T.

The generated output tile Dout_T may be loaded to the output buffer device 130. In example embodiment, the output tile Dout_T may have as a size of Tm×Tc×Tr. Tm denotes the number of channels of the output tile Dout_T, Tc denotes a width of the output tile Dout_T, and Tr denotes a height of the output tile Dout_T. Tm, Tc, and Tr may be determined according to the size of the input tile Din_T and the kernel size. In an example embodiment, the output tile Dout_T stored in the output buffer device 130 may be provided to the external memory 101.

In an example embodiment, on other input tiles of the input data Din, the above-described convolution computations may be recursively performed and results of the recursive performances may be combined to generate the output data Dout.

In an example embodiment, as described above, the input data Din is divided in a uniform size (i.e. a uniform tile unit) and the above described convolution computation may be performed on each divided input tile. Accordingly, since not being influenced by a hardware limitation such as a memory bandwidth or memory capacity, the computation for the input data may be efficiently performed.

In an example embodiment, a flow of the above-described convolution computation may be represented as Table 3. An algorithm configuration or program code shown in Table 3 is for exemplarily showing the flow of convolution computation, but the scope of the inventive concept is not limited thereto.

TABLE 3

```
// Basic convolution computation
for ( row=0 ; row<R ; row+=Tr) {
  for ( col=0 ; col<C ; col+=Tc) {
    for ( to=0 ; to<M ; to+=Tm) {
      for ( ti=0 ; ti<N ; ti+=Tn) {
        // load tiled input
        // load tiled weights
        // load tiled output
        // on-chip data computation
        for ( trr=row ; trr <min (row+Tr , R) ; trr++) {
          for ( tcc=col ; tcc <min (col+Tc , C) ; tcc++) {
            for ( too=to ; too<min ( to+Tm, M) ; too++) {
              for ( tii=ti ; tii <min ( ti +Tn , N) ; tii++) {
                for ( i=0 ; i<K ; i++) {
                  for ( j=0 ; j<K ; j++) {
                    output [too] [trr] [tcc] +=
                      weights [too] [tii] [i] [j] *
                      input [tii] [ S*trr+i] [ S*tcc+j];
        }}}}}}
        // store tiled output
}}}}
```

In example embodiment, Th indicating the height of the input tile Din_T may be expressed as {Tr+K−1} and Tw indicating the width of the input tile Din_T may be expressed as {Tc+K−1}. Although not shown in the algorithm configuration of Table 3, Th and Tw may be expressed as a size of the input buffer device 110 at the time of actual implementation with hardware.

Referring to Table 3, a partial convolution loop computation expressed with variables of Tr, Tc, Tm, Tn, and K is operated with a hardware engine and this hardware engine may be recursively performed as many times as the number (i.e. the number of input tiles Din_T) of entire divisions for the input data Din.

A CNN model having the above-described configuration may be implemented with hardware such as an FPGA or GPU. At this point, in consideration of resources, an operation time, power consumption of a hardware platform, and the like, the sizes of an input and input buffer device 110, the size of the output buffer device 130, the size of the weight kernel buffer device 140, the number of parallel processing MAC cores, and the number of memory accesses are required to be determined.

In order to design a typical neural network, design parameters are determined under an assumption that kernel weights are full of non-zero values, not '0's. In other words, a rooftop model is used to determine a typical neural network design parameter. However, when a neural network model is implemented on mobile hardware or a limited FPGA, due to hardware limitation, a method or a device for reducing a size of the neural network is required. In a neural network computation requiring lots of parameters, a method for reducing the size of the number of parameters necessary for reducing the entire computation is called as 'deep compression'.

Through the deep compression of the neural network, weight kernels used in the convolution computation may be compressed in a sparse weight type. As an element of the compressed neural network, the sparse weights are configured to represent a compressed connection or compressed kernel, rather than to represent connections of all neurons. For example, for a weight kernel of a two-dimensional K×K size, a part of weight values is compressed to have '0'. At this point, a weight not having '0' is called as a sparse weight.

When a kernel having sparse weights (i.e. a sparse weight kernel), a computation amount in the CNN may be reduced. In other words, the entire computation amount may be reduced according to sparsity of a weight kernel filter. For example, for the weight kernel of the two-dimensional K×K size, when '0' occupies 90% of the entire weights, the sparsity may be 90%. Accordingly, when a weight kernel of which sparsity is 90%, an actual computation amount may be reduced by 10% in comparison to that of a case where a typical weight kernel (i.e. non-sparse weight kernel) is used.

Figure 5:
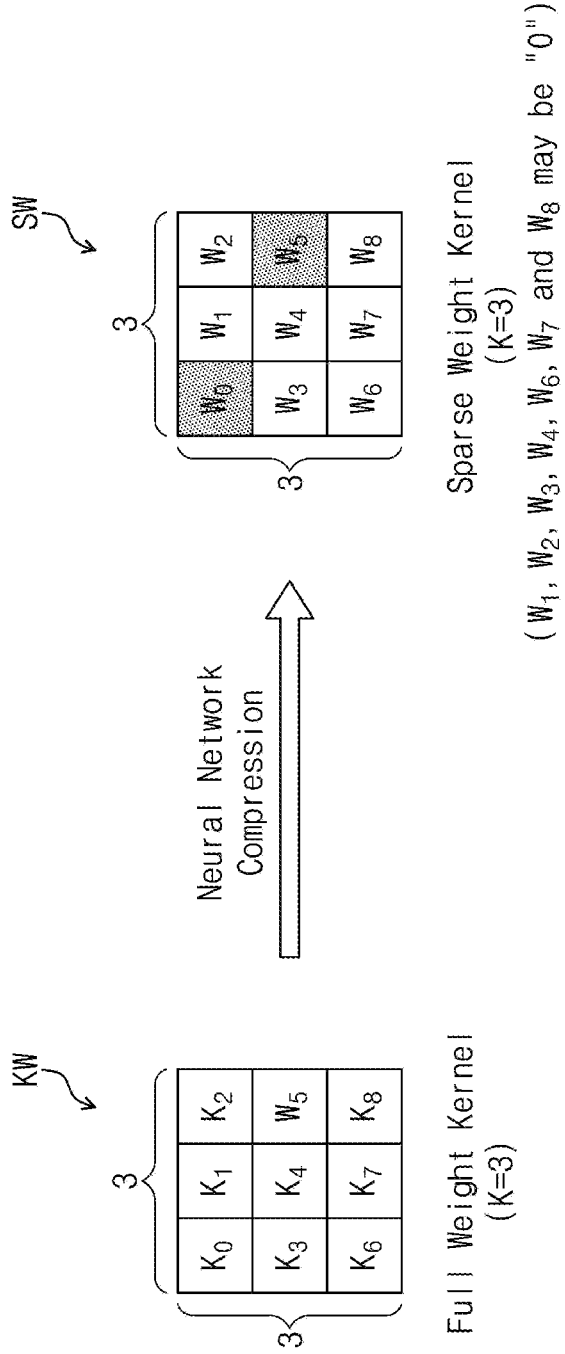
FIG. 5 exemplarily shows a sparse weight kernel of an embodiment of the inventive concept.

FIG. 5 is a drawing for explaining a sparse weight kernel of an embodiment of the inventive concept. For brief explanation, it is assumed that in a weight kernel, K is 3, and the number of channels is 1. In other words, the weight kernel may have a size of 1×3×3.

Referring to FIG. 5, a full weight kernel KW in a typical neural network model may be transformed to a sparse weight kernel SW through a neural network compression.

When K is 3, the full weight kernel KW may be represented as a matrix having 9 weight values $K_0$ to $K_8$. A neural network compression operation may include various operations such as parameter dropout, weight sharing, and quantization. A parameter dropout scheme is to omit a part of neurons in an input data or hidden layer. A weight sharing scheme is to share parameters by mapping, to a single representative value, identical or similar parameters for each layer in a neural network. A quantization scheme is to quantize weights or data sizes of the input/output layer and hidden layer. However, the neural network compression operation is not limited to the above-described schemes, and may include other various compression schemes.

The full weight kernel KW is changed to the sparse weight kernel SW of which a part of weight values have '0s' through the neural network compression. For example, through the neural network compression, the weight values $K_0$ to $K_8$ of the full weight kernel KW are respectively transformed to weight values $W_0$ to $W_8$ of the sparse weight kernel SW. At this point, through various algorithms, a part of weights $W_1$, $W_2$, $W_3$, $W_4$, $W_6$, $W_7$, $W_8$ of the sparse weight kernel SW may have '0' value. In other words, a part of weight values $W_0$ to $W_8$ of the sparse weight kernel may have '0' values and the rest may have non-zero values. At this point, the non-zero values may be called as sparse weights.

Kernel characteristics in the compressed neural network may be determined by positions and values of the sparse weights (i.e. $W_0$ and $W_5$). Substantially, when the MAC cores 121 to 12i (see FIG. 3) perform convolution computations on the input tiles and weight kernels, multiplications or additions corresponding to '0' values in the weight kernel may be omitted. Accordingly, only multiplications and additions for the sparse weights ($W_0$ and $W_5$) may be performed. Accordingly, a computation amount in convolution computations using only the sparse weights of the sparse weight kernel SW will be greatly reduced. Since only the sparse weights, not the full weights, are exchanged with the external memory 201, the number of times of accessing the memory or the memory bandwidth may be reduced.

In example embodiment, when a partial convolution computation is performed using the sparse weight kernel, the algorithm of Table 3 may be transformed to that shown in Table 4.

TABLE 4

```
// on-chip data computation
    for ( too=to ; too<min ( to+Tm, M) ; too++) {
        for ( tii=ti ; tii <min ( ti +Tn , N) ; tii++) {
            for ( s=0; s<NNZ(too,tii) ; s++) {
                i=sparse_idx(too, tii, s) / K;
                j=sparse_idx(too, tii, s) % K;
                for ( trr=row ; trr <min (row+Tr , R ; trr++) {
                    for ( tcc=col ; tcc <min (col+Tc , C) ; tcc++) {
                        output [too] [trr] [tcc] +=
                            weights [too] [tii] [s] *
input [tii] [ S*trr+i] [ S*tcc+j];
}}}}}
```

Referring to Table 4, in comparison with the algorithm of Table 3, a loop computation performed in a kernel unit (K×K) is changed to a number of non-zeros (NNZ) that are not '0' in a sparse weight matrix. In other words, since computations are not performed on the weight values of '0' from among weight values of the weight kernel, the entire computation amount may be reduced. In addition, the MAC necessary for the computation may be implemented with R×C, a typical hardware configuration may be implemented.

Figure 6:
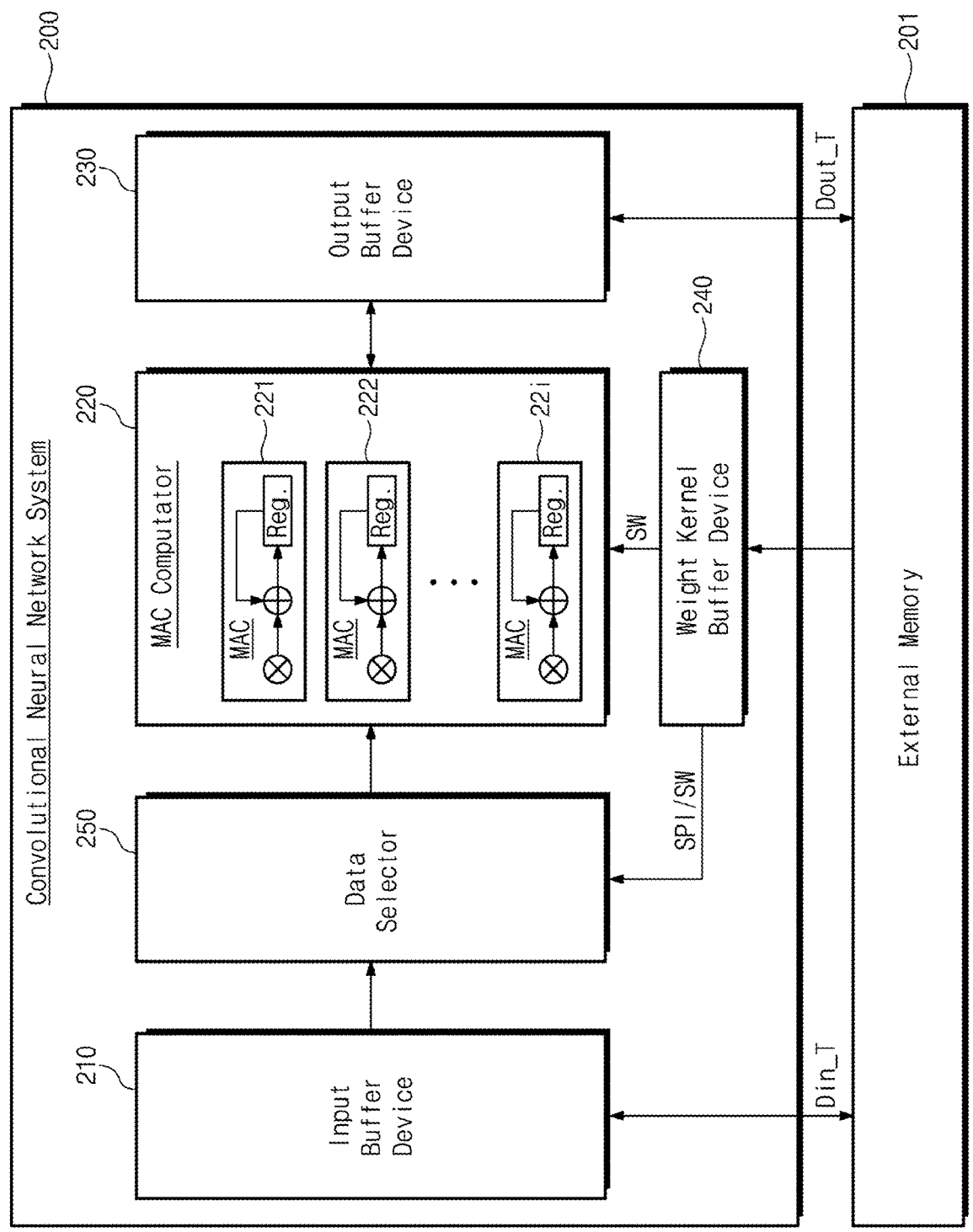
FIG. 6 is a block diagram showing a hardware configuration of a CNN system according to an embodiment of the inventive concept.

FIG. 6 is a block diagram shows a hardware configuration of a CNN system according to an embodiment of the inventive concept. Hereinafter, for brief explanation, it is assumed that a weight kernel used in the MAC computator 220 is the above-described sparse weight kernel SW. In addition, in order not to obscure embodiments of the inventive concept, descriptions about parameters (e.g. a bias etc.) other than the weight kernel will be omitted.

Referring to FIG. 6, a CNN system 200 may include an input buffer device 210, a MAC computator 220, an output buffer device 230, a weight kernel buffer device 250, and a data selector 250. The MAC computator 220 may include a plurality of MAC cores 221 to 22i. In example embodiment, each of the plurality of MAC cores 221 to 22i may perform a similar operation to or has a similar structure to the MAC core L1_1 described in relation to FIG. 2. The CNN system 200 may be configured to exchange the input tile Din_T and the output tile Dout_T with the external memory 201.

The input buffer device 210, the MAC computator 220, the output buffer device 230, the weight kernel buffer device 240, the plurality of MAC cores 221 to 22i, and the external memory 201 have been described in relation to FIGS. 3 and 4, and thus detailed descriptions thereabout will be omitted.

The CNN system 200 may further include a data selector 250 in comparison with the CNN system 100 of FIG. 3. The data selector 250 may be configured to provide, to the MAC computator 220, only a part of data values of the input tile Din_T loaded to the input buffer device 210.

For example, the weight kernel buffer device 240 may include the sparse weight kernel SW. The data selector 250 may receive sparse indexes SPI of the sparse weight kernel SW from the weight kernel buffer device 240, and provide, to the MAC computator 220, the only part of data values of the input tile Din_T on the basis of the receive sparse indexes SPI. The sparse indexes SPI indicate information on positions of weights having nonzero values in the sparse weight kernel SW. For example, the sparse indexes SPI for the sparse weight kernel SW illustrated in FIG. 5 may indicate position information on $W_0$, and $W_5$ (i.e. {0, 0}, {1, 2} in a type of {column, row} or (0, 5) in a simple position type (i.e. an index number)).

In a detailed example, as described above, when the weight kernel is the sparse weight kernel SW configured from a sparse matrix, a multiplication or an addition for a weigh value of '0' may be omitted. In other words, the data selector 250 may provide, to the MAC computator 220, only data values corresponding to nonzero weights on the basis of the sparse indexes SPI, and the MAC computator 220 may perform additions or multiplications for the provided data values. Accordingly, computations corresponding to the weight '0' may be omitted.

In example embodiment, a hardware configuration of the data selector 250 will be described in detail in relation to FIGS. 7 to 9. However, the configuration of the data selector 250 is not limited to various hardware configurations to be described below, and may be modified in various types.

Figure 7:
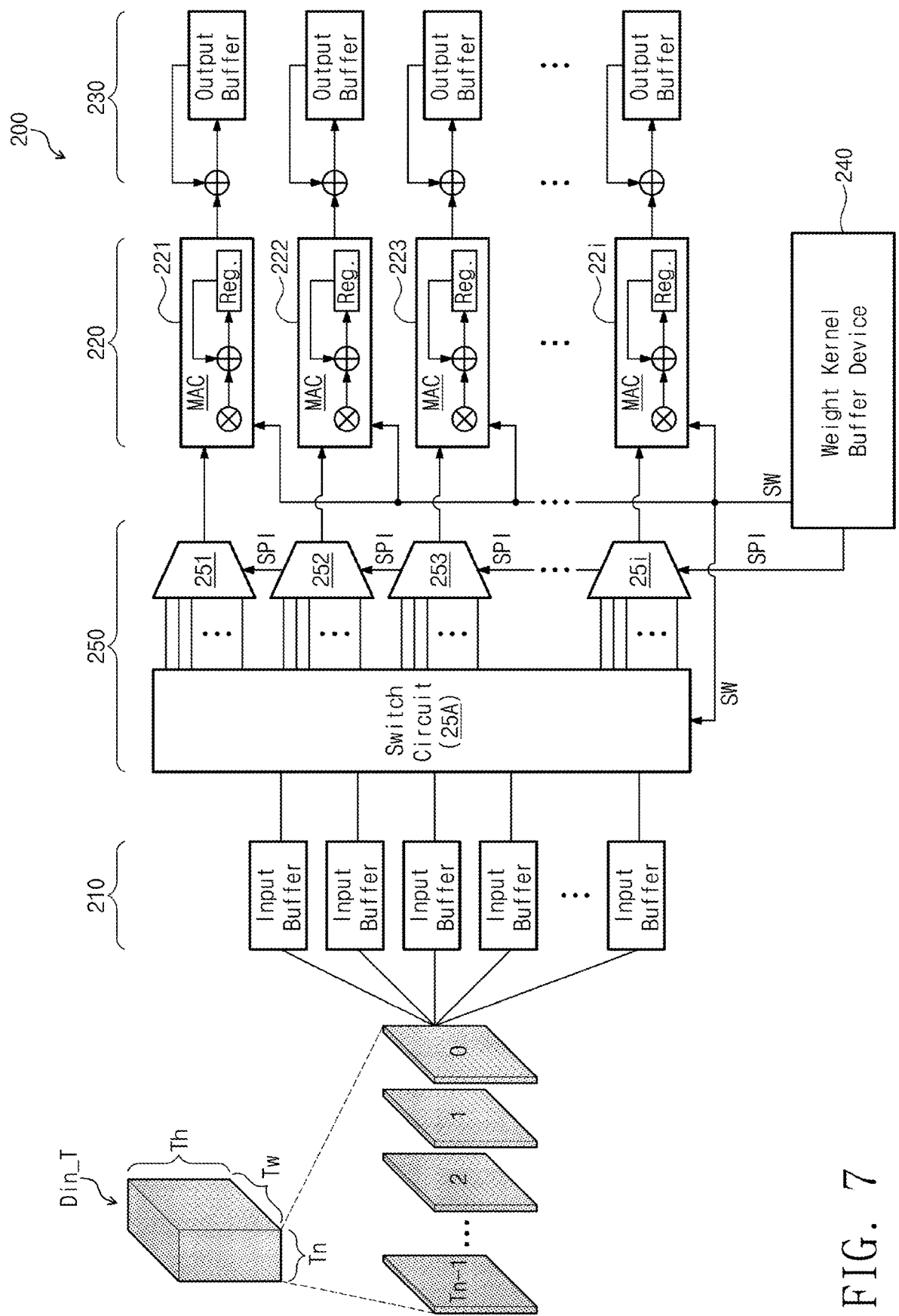
FIG. 7 is a block diagram illustrating in detail the CNN system of FIG. 6.

FIG. 7 is a block diagram illustrating in detail the CNN system of FIG. 6. For brief explanation, a configuration of the CNN system 200 for one input tile Din_T is illustrated in FIG. 7. However, the scope of the inventive concept is not limited thereto, and the CNN system 200 may further include elements for other respective input tiles, or may recursively perform computation operations on each input tile on the basis of the elements illustrated in FIG. 7.

Referring to FIGS. 6 and 7, the CNN system 200 may include the input buffer device 210, the MAC computator 220, the output buffer device 230, the weight kernel buffer device 250, and the data selector 250. The input buffer device 210, the MAC computator 220, the output buffer device 230, the weight kernel buffer device 240, and the data selector 250 have been described in relation to FIG. 6, and thus detailed descriptions thereabout will be omitted.

The input buffer device 210 may include a plurality of input buffers. Each of the plurality of input buffers may be configured to load data values of the input tile Din_T. For example, the input tile Din_T may have a size of Tn×Tw× Th. The input tile Din_T may be divided into sub input tiles having the size of Tw×Th for each channel. Each data value of the sub input tile may be loaded into input buffers. In example embodiment, according to the number of channels of the weight kernel, respective data values of the plurality of sub input tiles may be loaded to input buffers in parallel.

The data selector 250 may include a switch circuit 25A and a plurality of multiplexers (MUXes) 251 to 25i. The switch circuit 25A may provide, to the plurality of MUXes 251 to 25i, respective data values stored in the plurality of input buffers on the basis of the sparse weight kernel SW.

For example, it is assumed that Tw=3, Th=3, and Tn=1, and K=2 and a stride is 1 in the sparse weight kernel SW. In this case, the input tile Din_T may be represented as a matrix having $0^{th}$ to $8^{th}$ input values $I_0$ to $I_8$, and the $0^{th}$ to $8^{th}$ input values $I_0$ to $I_8$ may be respectively stored in $0^{th}$ to $8^{th}$ input buffers. At this point, the switch circuit 25A may connect the $0^{th}$, $1^{st}$, $3^{rd}$ and $4^{th}$ input buffers to a first MUX 251 so that the $0^{th}$, $1^{st}$, $3^{rd}$ and $4^{th}$ input buffers $I_0$, $I_1$, $I_3$, and $I_4$ are provided to the first MUX 251. In addition, the switch circuit 25A may connect the 1st, $2^{nd}$, $4^{th}$, and $5^{th}$ input buffers to a second MUX 252 so that the $1^{st}$, $2^{nd}$, $4^{th}$ and $5^{th}$ input buffers $I_1$, $I_2$, $I_4$, and $I_5$ are provided to the second MUX 252. Similarly, the switch circuit 25A may connect the 3rd, $4^{th}$, $6^{th}$, and $7^{th}$ input buffers to a third MUX 253 so that the $3^{rd}$, $4^{th}$, $6^{th}$, and $7^{th}$ input buffers $I_3$, $I_4$, $I_6$, and $I_7$ are provided to the third MUX 253. The switch circuit 25A may connect, to each other, the plurality of input buffers and the plurality of MUXes 251 to 25i on the basis of the sparse weight kernel SW.

Each of the plurality of MUXes 251 to 25i may select any one of data values from the connected input buffers to provide the data values to the MAC cores 221 to 22i of the MAC computator 220 on the basis of the sparse indexes SPI from the weight kernel buffer device 240. For example, each of the MUXes 251 to 25i may select a data value corresponding to a nonzero weight position on the basis of the sparse index SPI, and deliver the selected data value to the MAC core 221. For a detailed example, it is assumed that Tw=3, Th=3, and Tn=1, and K=2 and a stride is 1 in the sparse weight kernel SW, and the sparse index SPI (i.e. a position of nonzero weight) is [0, 0]. In this case, as described above, the $0^{th}$, $1^{st}$, $3^{rd}$, and $4^{th}$ data values $I_0$, $I_1$, $I_3$, and $I_4$ may be provided to the first MUX 251. As described above, since the sparse index SPI is [0, 0], convolution computations may be omitted for data values other than a data value corresponding to a position of [0, 0] In other words, since the convolution computation for the $0^{th}$ data value $I_0$ corresponding to the position (i.e. [0, 0]) indicated by the sparse index SPI is required to be performed, the MAX 251 may select the $0^{th}$ data value $I_0$ corresponding to the position (i.e. [0, 0]) indicated by the sparse index SPI and provide the selected value to the MAC core 221. Other MUXes 252 to 25i may perform similar operations to the above-described.

Each of the plurality of MAC cores 221 to 22i of the MAC computator 220 may perform multiplications and additions (i.e. convolution computations) on the basis of a received data value and the sparse weight kernel SW.

The output buffer device 230 includes a plurality of output buffers, and each of the output buffers may store or accumulate output data from the plurality of MAC cores 221 to 22i. For example, the MAC computator may perform a convolution computation for the input tile Din_T by using a first sparse weight kernel. Hereafter, the MAC computator 220 may perform a convolution computation for the input tile Din_T by using a second sparse weight kernel different from the first sparse weight kernel. A result of the convolution computation using the first sparse weight kernel may be a first channel of an output tile Dout_T, and a result of the convolution computation using the second sparse weight kernel may be a second channel of the output tile Dout_T. In other words, the output buffer device 230 may store or accumulate, as different channels of the output tile Dout_T, the results of convolution computations performed using a plurality of sparse weight kernels. In short, when a convolution computation is performed using M sparse weight kernels with respect to one input tile Din_T, the output tile Dout_T may have M channels.

As described above, the data selector 250 according to the inventive concept provides, to the MAC computator 220, only a data value corresponding to a position of a nonzero weight value on the basis of the sparse index SPI of the sparse weight kernel SW. Therefore, a convolution computation for a data value corresponding to a position of a zero weight value may be omitted. Accordingly, a computation efficiency of the CNN system 200 is enhanced.

Figure 8:
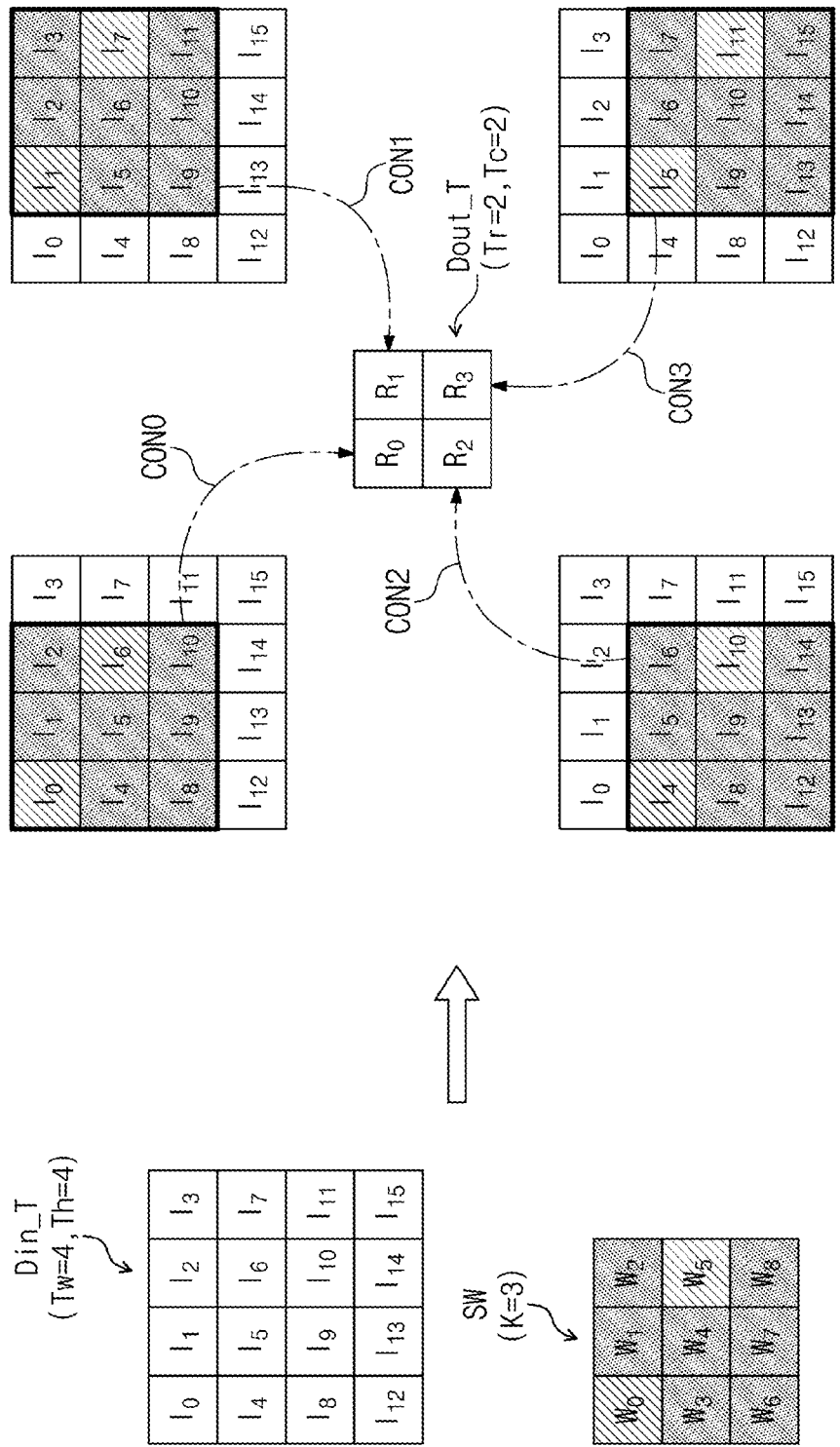
FIGS. 8 and 9 are drawings for explaining in detail an operation of the CNN system of FIG. 7.
Figure 9:
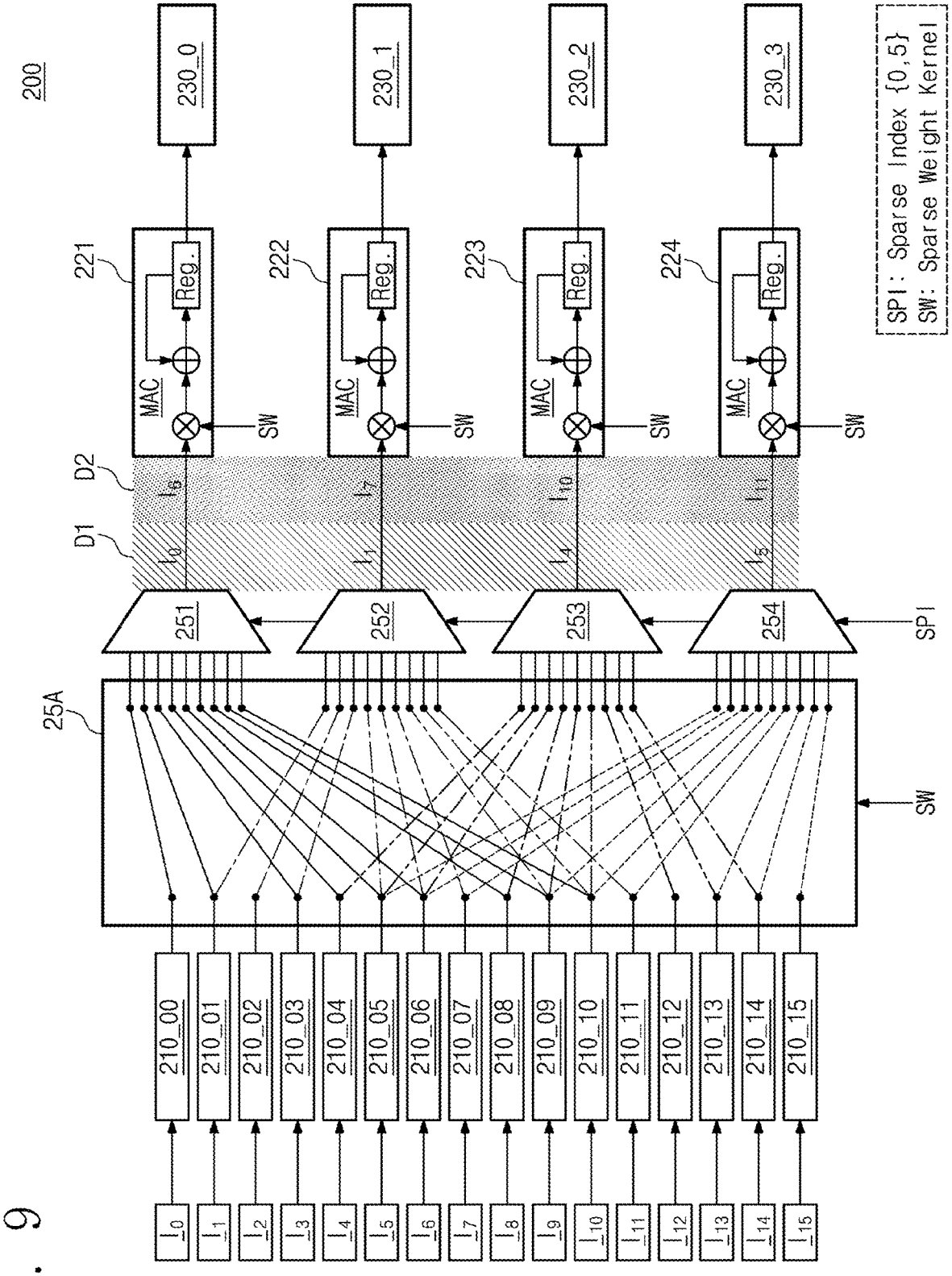

FIGS. 8 and 9 are drawings for explaining in detail an operation of the CNN system. Unnecessary elements in clearly describing the operation of the CNN system 200 implemented with hardware according to the embodiment of the inventive concept will be omitted.

In addition, hereinafter, for conciseness of drawings and convenience of explanation, specific data conditions will be assumed. Referring to FIGS. 7 to 9, it is assumed that the number of channels Tn of the input tile Din_T is 1, the width Tw thereof is 4, and the height Th thereof is 4. In other words, the input tile Din_T may have the size of 1×4×4, and, as illustrated in FIG. 8, include $0^{th}$ to $15^{th}$ input values $I_0$ to $I_{15}$. The $0^{th}$ to $15^{th}$ input values $I_0$ to $I_{15}$ may be represented in a matrix type as illustrated in FIG. 8.

In addition, it is assumed that a K value indicating the width and height of the sparse weight kernel SW is 3, and a stride is 1. In other words, the sparse weigh kernel SW may have a size of 1×3×3, and include the $0^{th}$ and $8^{th}$ weight values. The 0th and $8^{th}$ input values $W_0$ to $W_8$ may be represented in a matrix type as illustrated in FIG. 8. In addition, it is assumed that $1^{st}$, $2^{nd}$, $3^{rd}$, $4^{th}$, $6^{th}$, $7^{th}$, and $8^{th}$ weight values $W_1$, $W_2$, $W_3$, $W_4$, $W_6$, $W_7$, $W_8$ among $0^{th}$ to $8^{th}$ weight values $W_0$ to $W_8$ are '0', and $0^{th}$ and $5^{th}$ weight values are not '0'. In other words, the sparse index SPI of the sparse weight kernel SW may correspond to positions of the $0^{th}$ and $5^{th}$ weight values $W_0$, and $W_5$.

Furthermore, the channel Tm of the output data Dout_T that is a result of the convolution computation performed based on the above-described input tile Din_T and the sparse weight kernel SW may be 1, the width Tc may be 2, and the height Tr may be 2.

The above-described conditions are to concisely and accurately explain technical characteristics of the inventive concept and the scope of the inventive concept is not limited thereto. The sizes and values of the input data, input tile, weigh kernel, and other parameters, etc., may be variously modified, and according to these modifications, the number or structures of hardware configurations included in the CNN system 200 may be modified.

With respect to the input tile Din_T and the sparse weight kernel SW illustrated in FIG. 8, the CNN system 200 may perform $0^{th}$ to $3^{rd}$ convolution computations CON0 to CON3.

For example, as illustrated in FIG. 9, the $0^{th}$ to $15^{th}$ input values $I_0$ to $I_{15}$ of the input tile Din-T may be respectively loaded to the $0^{th}$ to $15^{th}$ input buffers (210_00 to 210_15). The switch circuit 25A may connect the $0^{th}$ to $15^{th}$ input buffers 210_00 to 210_15 to the MUXes 221 to 224 on the basis of the sparse weight kernel SW. Each of the MUXes 221 to 224 may select one of input values from the input buffers 210_00 to 210_15 connected based on the sparse indexes SPI and provide the selected one to the MAC cores 221 to 224. Each of the MAC cores 221 to 224 may use the received input value and sparse weight kernel SW to perform the convolution computation.

In example embodiment, the switch circuit 25A may connect, to each other, the plurality of input buffers and the plurality of MUXes on the basis of the sparse weight kernel SW and the size (i.e. Tn×Tw×Th) of the input tile Din_T. However, since the size of the input tile Din_T is not assumed to be a specific size in order to accurately describe the embodiments of the inventive concept, such configurations of FIGS. 6 and 7 are not separately shown. However, the scope of the inventive concept is not limited thereto, and the configuration of or connection relations by the switch circuit 25A may be variously modified on the basis of the sparse weight kernel SW and the size (i.e. Tn×Tw×Th) of the input tile Din_T.

Hereinafter, the operation of the data selector 250 and the convolution computation will be described in detail.

A $0^{th}$ convolution computation CON0 may be performed by the MAC core 221. For example, the $0^{th}$ convolution computation CON0 is performed on the basis of $0^{th}$, $1^{st}$, $2^{nd}$, $4^{th}$, $5^{th}$, $6^{th}$, $8^{th}$, $9^{th}$, and $10^{th}$ input values $I_0$, $I_1$, $I_2$, $I_4$, $I_5$, $I_6$, $I_8$, $I_9$, and $I_{10}$ of the input tile Din_T and the sparse weight kernel SW, and as a result of the $0^{th}$ convolution computation, a $0^{th}$ output value R0 may be generated.

For example, as described above, the switch circuit 25A may connect (see solid lines inside the switch circuit 25A of FIG. 9) the input buffers 210_00, 210_01, 210_02, 210_04, 210_05, 210_06, 210_08, 210_09, and 210_10 to a MUX 251 such that the basis of $0^{th}$, $1^{st}$, $2^{nd}$, $4^{th}$, $5^{th}$, $6^{th}$, $8^{th}$, $9^{th}$, and $10^{th}$ input values $I_0$, $I_1$, $I_2$, $I_4$, $I_5$, $I_6$, $I_8$, $I_9$, and $I_{10}$ are provided to the MUX 251. The MUX 251 may select one of the input values from the input buffers 210_00, 210_01, 210_02, 210_04, 210_05, 210_06, 210_08, 210_09, 210_10 connected on the basis of the sparse indexes SPI and provide the selected one to the MAC core 221.

As described in relation to FIG. 8, the sparse indexes SPI may correspond to positions of the $0^{th}$ and $5^{th}$ weights $W_0$ and $W_5$. In this case, in the $0^{th}$ convolution computation CON0, the $0^{th}$ input data $I_0$ may correspond to the position of the $0^{th}$ weight value $W_0$ and the $6^{th}$ input data $I_6$ may correspond to the position of the $5^{th}$ weight value $W_5$. In this case, the MUX 251 may output first the $0^{th}$ input data $I_0$ corresponding to the position of the $0^{th}$ weight value $W_0$. The MAC core 221 may perform a multiplication on the received $0^{th}$ input data $I_0$ and the $0^{th}$ weight value $W_0$ of the sparse weight kernel SW, and store the result in an internal register. Thereafter, the MUX 251 may output the $6^{th}$ input data $I_6$ corresponding to the position of the $5^{th}$ weight value $W_5$ on the basis of the sparse index SPI. The MAC core 221 may perform a multiplication on the $6^{th}$ input data $I_6$ and the 5th weight value $W_5$ of the sparse weight kernel SW, and perform an addition for accumulating the multiplication result to a value stored in the register (i.e. the multiplication result value of the $0^{th}$ input data and the $0^{th}$ weight value $W_0$). The computation result may be stored in the internal register. Thereafter, since computations for the input values corresponding to the positions included in the sparse indexes SPI are all performed, the $0^{th}$ convolution computation CON0 is terminated and the computation result is provided to an output buffer 230_0 as the $0^{th}$ output value R0.

A 1st convolution computation CON1 may be performed by the MAC core 222. For example, the $1^{st}$ convolution computation CON1 is performed on the basis of the basis of $1^{st}$, $2^{nd}$, $3^{rd}$, $5^{th}$, $6^{th}$, $7^{th}$, $9^{th}$, $10^{th}$, and $11^{th}$ input values $I_1$, $I_2$, $I_3$, $I_5$, $I_6$, $I_7$, $I_9$, $I_{10}$ and $I_{11}$ of the input tile Din_T and the sparse weight kernel SW, and as a result of the 1st convolution computation, a $1^{st}$ output value $R_1$ may be generated.

For example, as described above, the switch circuit 25A may connect (see first broken lines inside the switch circuit 25A of FIG. 9) the input buffers 210_01, 210_02, 210_03, 210_05, 210_06, 210_07, 210_09, 210_10, 210_11 to a MUX 252 such that $1^{st}$, $2^{nd}$, $3^{rd}$, $5^{th}$, $6^{th}$, $7^{th}$, $9^{th}$, $10^{th}$, and $11^{th}$ input values $I_1$, $I_2$, $I_3$, $I_5$, $I_6$, $I_7$, $I_9$, $I_{10}$ and $I_{11}$ are provided to the MUX 252. The MUX 252 may select one of the input values from the input buffers 210_01, 210_02, 210_03, 210_05, 210_06, 210_07, 210_09, 210_10, 210_11 connected on the basis of the sparse indexes SPI and provide the selected one to the MAC core 222.

As described in relation to FIG. 8, the sparse indexes SPI may correspond to the positions of the $0^{th}$ and $5^{th}$ weights $W_0$, and $W_5$. In this case, in the $1^{st}$ convolution computation CON1, the $1^{st}$ input data $I_1$ may correspond to the position of the 0$^{th}$ weight value W$_0$ and the 7$^{th}$ input data I$_7$ may correspond to the position of the 5$^{th}$ weight value W$_5$. Similarly as described in relation to the 0$^{th}$ convolution computation CON0, the MUX 252 sequentially transmits the 1$^{st}$ and 7$^{th}$ input values I$_1$ and I$_7$ to the MAC core 222, and the MAC core 222 may perform the 1$^{st}$ convolution computation CON1 on the 1$^{st}$ and 7$^{th}$ input values I$_1$ and I$_7$ on the basis of the sparse weight kernel SW. As a result of the first convolution computation CON1, a first output value R$_1$ is generated and the first output value R$_1$ may be provided to an output buffer 230_1.

Similarly as described in relation to the 0$^{th}$ and 1$^{st}$ convolution computations CON0 and CON1, the MAC cores 223 and 224 may perform 2$^{nd}$ and 3$^{rd}$ convolution computations CON2 and CON3. The switch circuit 25A may connect (see dotted lines inside the switch circuit 25A of FIG. 9) the input buffers 210_04, 210_05, 210_06, 210_08, 210_09, 210_10, 210_12, 210_13, 210_14 to MUX 253 such that the 4$^{th}$, 5$^{th}$, 6$^{th}$, 8$^{th}$, 9$^{th}$, 10$^{th}$, 12$^{th}$, 13$^{th}$ and 14$^{th}$ input values I$_4$, I$_5$, I$_6$, I$_8$, I$_9$, I$_{10}$, I$_{12}$, I$_{13}$, and I$_{14}$ are provided to the MUX 253. The switch circuit 25A may connect (see second dashed lines inside the switch circuit 25A of FIG. 9) the input buffers 210_05, 210_06, 210_07, 210_09, 210_10, 210_11, 210_13, 210_14, 210_15 to MUX 253 such that the 5$^{th}$, 6$^{th}$, 7$^{th}$, 9$^{th}$, 10$^{th}$, 11$^{th}$, 13$^{th}$, 14$^{th}$ and 15$^{th}$ input values I$_5$, I$_6$, I$_7$, I$_9$, I$_{10}$, I$_{11}$, I$_{13}$, I$_{14}$, and I$_{15}$ are provided to the MUX 253.

For the second convolution computation CON2, the MUX 253 sequentially output the 4th and 10th input values I$_4$ and I$_{10}$ on the basis of the sparse indexes SPI, and the MAC core 223 may perform the second convolution computation CON2 on the 4$^{th}$ and 10$^{th}$ input values I$_4$ and I$_{10}$ on the basis of the sparse weight kernel SW. A second output value R$_2$ that is a result of the second convolution computation CON2 may be stored in an output buffer 230_2.

For the third convolution computation CON3, the MUX 254 sequentially output the 5$^{th}$ and 11$^{th}$ input values I$_5$ and I$_{11}$ on the basis of the sparse indexes SPI, and the MAC core 224 may perform the 3$^{rd}$ convolution computation CON3 on the 5$^{th}$ and 11$^{th}$ input values I$_5$ and I$_{11}$ on the basis of the sparse weight kernel SW. A third output value R$_3$ that is a result of the third convolution computation CON3 may be stored in an output buffer 230_3.

In the above-described embodiments, for convenience and clearness of explanation, the 0$^{th}$ to 3$^{rd}$ convolution computations CON0 to CON3 are distinguishably described, but the scope of the inventive concept is not limited thereto, and the 0$^{th}$ to 3$^{rd}$ convolution computations CON0 to CON3 may be performed in parallel. For example, the input values I$_0$ to I$_{15}$ of the input tile Din_T are loaded to the input buffers 210_00 to 210_15, and the switch circuit 25A may be configured as described above in connections between the input buffers 210_00 to 210_15 and the MUXes 251 to 254. Thereafter, each of the MUXes 251 to 254 may output, as a first data set D1, the 0$^{th}$, 1$^{st}$, 4$^{th}$, and 5$^{th}$ input values I$_0$, I$_1$, I$_4$, and I$_5$ corresponding to positions of the 0$^{th}$ weight values W$_0$. The MAC cores 221 to 224 may respectively perform convolution computations on the basis of the 0$^{th}$, 1$^{st}$, 4$^{th}$, and 5$^{th}$ input values I$_0$, I$_1$, I$_4$, and I$_5$ and the sparse weight kernel SW. Thereafter, each of the MUXes 251 to 254 may output, as a second data set D2, the 6$^{th}$, 7$^{th}$, 10$^{th}$, and 11$^{th}$ input values I$_6$, I$_7$, I$_{10}$, and I$_{11}$ corresponding to positions of the 5$^{th}$ weight values W$_5$. The MAC cores 221 to 240 may respectively perform convolution computations on the basis of the 6$^{th}$, 7$^{th}$, 10$^{th}$ and 11$^{th}$ input values I$_6$, I$_7$, I$_{10}$, and I$_{11}$ and the sparse weight kernel SW.

In other words, the data selector 250 outputs the input values corresponding to positions of one weight value in the plurality of kernel areas on the basis of the sparse indexes SPI, and the MAC computator 220 performs the convolution computations for the received input values on the basis of the sparse weight kernel SW. Since the data selector 250 only outputs the input data corresponding to the positions of the nonzero weight values on the basis of the sparse indexes SPI (in other words, since input values corresponding to positions of nonzero weight values are not output), convolution computations corresponding 0 weights may be omitted. In short, as the number of '0's increases in the weight values of the weight kernel, a convolution computation reduction effect increases and accordingly the entire performance of the CNN system may be enhanced.

The above-described embodiments show the computation operations performed in one convolutional layer. However, the scope of the inventive concept is not limited thereto, and the CNN system according to the inventive concept may recursively perform the computation operations or convolutional layer according to the above-described embodiments.

Figure 10:
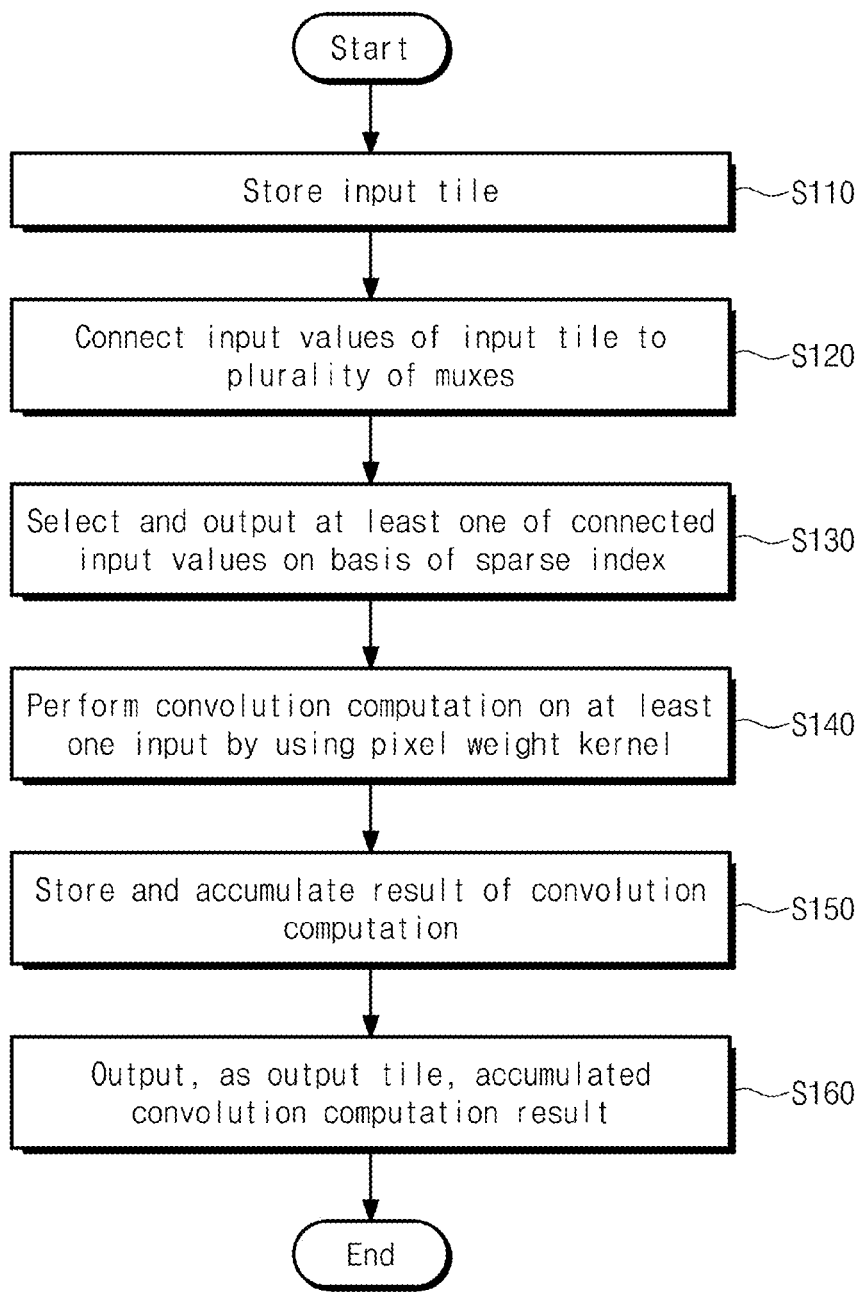
FIG. 10 is a flowchart schematically showing an operation of a CNN system according to an embodiment of the inventive concept.

FIG. 10 is a flowchart schematically showing an operation of a CNN system according to an embodiment of the inventive concept. Referring to FIGS. 6, 7, and 10, in operation S110, the CNN system 200 may store an input tile. For example, the input buffer device 210 of the CNN system 200 may store, as described above, the input tile Din_T that is a part of the input data Din from the external memory 201.

In operation S210, the CNN system 200 may connect input values of the input tile to the plurality of MUXes 251 to 25$i$. For example, as described in relation to FIG. 7, the switch circuit 25A of the CNN system 200 may connect the input values of the input tile Din_T to the plurality of MUXes 251 to 25$i$ on the basis of the sparse weight kernel SW.

In operation S130, the CNN system 200 may select at least one of the input values connected on the basis of the sparse indexes SPI. For example, as described in relation to FIG. 7, the plurality of MUXes 251 to 25$i$ may respectively select the input values corresponding to the positions of the sparse weights on the basis of the sparse indexes SPI. At this point, input values that are not correspond to the positions of the sparse weights (i.e. input values corresponding to positions of 0 weights) may not be selected.

In operation S140, the CNN system 200 may perform a convolution computation on at least one input value by using the sparse weight kernel. For example, as described in relation to FIG. 7, the plurality of MAC cores 221 to 22$i$ of the MAC computator 220 may respectively perform, by using the sparse weight kernel, the convolution computations on the input values output from the plurality of MUXes 251 to 25$i$.

In operation S150, the CNN system 200 may store and accumulate the results of the convolution computations. For example, as described in relation to FIG. 7, the output buffer device 230 may store the computation results from the MAC computator 220.

In example embodiment, when a plurality of sparse weight kernels are used, operations S130 and S140 may be recursively performed on each of the plurality of sparse weight kernels. The recursive performance results may be accumulated in the output buffer device 230.

In operation S160, the CNN system 200 may output, as the output tile, the accumulated results of the convolution computations. For example, as described in relation to FIG. 6, when all convolution computations for the input tile Din_T are performed, the output buffer device 230 may accumulate and provide the computation results to the external memory 201.

In example embodiment, the CNN system 200 may perform the above-described operation on each of the all input tiles of the input data Din, and then, output a plurality of output tiles to the external memory 201. The plurality of output tiles are combined to each other or accumulated to generate final output data Dout.

As described above, the CNN system according to the inventive concept may reduce the number or size of parameters required for computation through neural network compression, and accordingly, required computations may be reduced. At this point, the CNN system according to the inventive concept may enable the hardware configuration to be concise by using sparse indexes associated with the weights. Therefore, since it is advantageous for performance enhancement or conciseness of the hardware configuration in which hardware is implemented in an equal interval array and operates to have repeatability, the CNN system according to the inventive concept may effectively operate a hardware engine while maintaining regularity of hardware arrangement.

According to the embodiments of the inventive concept, a convolutional neural network system is provided for more effectively performing computations of a convolutional neural network algorithm using parameters (e.g., a weight kernel) configured of a sparse matrix.

The convolutional neural network system according to an embodiment of the inventive concept may selectively perform a convolution computation on input data on the basis of the sparse matrix. Accordingly, the convolutional neural network system according to an embodiment of the inventive concept has an effective computation flow in a small hardware, and therefore the entire computation efficiency of the convolutional neural network is enhanced.

Furthermore, the convolutional neural network system according to an embodiment of the inventive concept may provide an effective hardware structure in processing a sparse weight kernel. Typically, it is better that a hardware configuration is realized in an equal interval array and recursively operates. Thus, a convolutional neural network according the embodiments of the inventive concept may effectively operate a hardware engine while maintaining a regularity of the hardware array.

The above-described is detailed embodiments for practicing the present inventive concept. The present disclosure includes not only the above-described embodiments but also simply changed or easily modified embodiments. In addition, the present inventive concept also include techniques easily modified and practiced using the embodiments of the present disclosure. Therefore, the scope of the present disclosure is not limited to the described embodiments but is defined by the claims and their equivalents.

What is claimed is:

1. A convolutional neural network system comprising:
  a data selector configured to output an input value corresponding to a position of a sparse weight from among input values of input data on a basis of a sparse index indicating the position of a nonzero value in a sparse weight kernel; and
  a multiply-accumulate (MAC) computator configured to perform a convolution computation on the input value output from the data selector by using the sparse weight kernel,
  wherein the sparse weight kernel comprises at least one weight value of '0',
  wherein the data selector comprises:
    a switch circuit; and
    a plurality of multiplexes (MUXes),
    wherein the switch circuit is configured to provide the respective input values to the plurality of MUXes on a basis of the sparse weight kernel, and
    each of the plurality of MUXes is configured to select and output, on a basis of the sparse index, the input value corresponding to the position of the sparse weight from among the input values provided by the switch circuit.

2. The convolutional neural network system of claim 1, wherein the data selector is configured not to output, from among the input values, an input value corresponding to a position of '0' in the sparse weight kernel.

3. The convolutional neural network system of claim 1, further comprising:
  an input buffer device configured to store, from an external memory, an input tile that is a part of the input data; and
  an output buffer device configured to store a result value of the convolution computation from the MAC computator and to provide the stored result value to the external memory.

4. The convolutional neural network system of claim 1, further comprising:
  a weight kernel buffer device configured to receive the sparse weight kernel from an external memory, provide the received sparse weight kernel to the MAC computator, and provide the sparse index of the sparse weight kernel to the data selector.

5. The convolutional neural network system of claim 1, wherein the MAC computator comprises a plurality of MAC cores configured to receive the respective input values output from the plurality of MUXes, and to perform the convolution computation on the received input values on the basis of the sparse weight kernel.

6. The convolutional neural network system of claim 5, wherein each of the plurality of MAC cores comprises:
  a multiplier configured to perform a multiplication on the input value and the sparse weight;
  an adder configured to perform addition on a result of the multiplication and a previous addition result; and
  a register configured to store a result of the addition.

7. The convolutional neural network system of claim 1, wherein the sparse weight kernel is a weight kernel converted from a full weight kernel through a neural network compression, and
  the full weight kernel is configured from nonzero weight values.

8. The convolutional neural network system of claim 7, wherein the neural network compression is performed on a basis of at least one of a parameter dropout scheme, a weight sharing scheme, or a parameter quantization scheme for the full weight kernel.

9. A convolutional neural network system comprising:
  an input buffer device configured to receive, from an external memory, an input tile comprising a plurality of input values, and store the plurality of input values of the received input tile;
  a data selector configured to output at least one input value from among the plurality of input values from the input buffer device on a basis of a sparse index indicating a position of a sparse weight of nonzero in a sparse weight kernel;

a multiply-accumulate (MAC) computator configured to perform a convolution computation on a basis of the sparse weight and the at least one input value from the data selector; and an output buffer device configured to store a result value of the convolution computation from the MAC computator and to provide the stored result value to the external memory as an output tile, wherein the data selector comprises:

a switch circuit; and a plurality of multiplexes (MUXes), wherein the switch circuit is configured to respectively connect the plurality of input values to the plurality of MUXes on a basis of the sparse weight kernel and a size of the input tile, and each of the plurality of MUXes is configured to select and output, on the basis of the sparse index, the at least one input value corresponding to the position of the sparse weight from among the connected input values.

10. The convolutional neural network system of claim 9, wherein each of the plurality of MUXes does not output an input value corresponding to a '0' weight in the sparse weight kernel.

11. The convolutional neural network system of claim 9, wherein the at least one input value from each of the plurality of MUXes is an input value corresponding to the position of the sparse weight.

12. The convolutional neural network system of claim 9, wherein, when the sparse weight kernel has a size of K×K (where K is a natural number), the switch circuit is configured to connect 2K input values to the plurality of MUXes.

13. The convolutional neural network system of claim 9, wherein the MAC computator comprises a plurality of MAC cores configured to perform the convolution computations on the basis of the sparse weight kernel and the at least one input value from each of the plurality of MUXes.

* * * * *